(12) United States Patent
Vargantwar et al.

(10) Patent No.: US 8,675,513 B1
(45) Date of Patent: Mar. 18, 2014

(54) METHOD AND SYSTEM FOR USING MULTI-CHANNEL COMMUNICATION LINKS

(75) Inventors: Sachin R. Vargantwar, Overland Park, KS (US); Bhagwan Khanka, Lenexa, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 399 days.

(21) Appl. No.: 12/827,604

(22) Filed: Jun. 30, 2010

(51) Int. Cl.
H04L 12/26 (2006.01)

(52) U.S. Cl.
USPC .......................................... 370/252; 370/329

(58) Field of Classification Search
None
See application file for complete search history.

(56) References Cited

U.S. PATENT DOCUMENTS

| | | | |
|---|---|---|---|
| 5,805,585 A | 9/1998 | Javitt et al. | |
| 6,373,831 B1* | 4/2002 | Secord et al. | 370/342 |
| 6,625,777 B1 | 9/2003 | Levin et al. | |
| 6,802,035 B2* | 10/2004 | Catreux et al. | 714/746 |
| 6,842,446 B2 | 1/2005 | Everson et al. | |
| 7,366,469 B1 | 4/2008 | Javitt et al. | |
| 7,653,139 B2 | 1/2010 | Li | |
| 7,889,707 B2* | 2/2011 | Niu et al. | 370/342 |
| 8,130,695 B2* | 3/2012 | Pi et al. | 370/318 |
| 8,456,989 B1 | 6/2013 | Sigg et al. | |
| 2001/0022000 A1 | 9/2001 | Horn et al. | |
| 2002/0075827 A1 | 6/2002 | Balogh et al. | |
| 2002/0086692 A1 | 7/2002 | Chheda et al. | |
| 2003/0103470 A1 | 6/2003 | Yafuso | |
| 2003/0143995 A1* | 7/2003 | Friedman et al. | 455/429 |
| 2004/0247993 A1* | 12/2004 | Johnson et al. | 429/50 |
| 2005/0220058 A1 | 10/2005 | Garg | |
| 2005/0250521 A1 | 11/2005 | Joshi et al. | |
| 2007/0110176 A1 | 5/2007 | Wu et al. | |
| 2007/0135125 A1 | 6/2007 | Kim et al. | |
| 2008/0031163 A1 | 2/2008 | Javitt et al. | |
| 2008/0212527 A1 | 9/2008 | Hosein et al. | |

(Continued)

FOREIGN PATENT DOCUMENTS

WO    WO 2010007367 A1 *   1/2010   ............... H04L 1/00

OTHER PUBLICATIONS

3rd Generation Partnership Project 2, "Physical Layer Standard for cdma2000 Spread Spectrum Systems, Revision E," 3GPP2 C.S0002-E, Version 1.0, Sep. 2009.
U.S. Appl. No. 12/827,683, filed Jun. 30, 2010.

*Primary Examiner* — Joseph Avellino
*Assistant Examiner* — Tsung Wu

(57) ABSTRACT

A mobile station and a radio access network (RAN) use a single-channel forward link and a single-channel reverse link for a communication session. If the quality of the communication session degrades, the single-channel forward link is replaced with a multi-channel forward link and/or the single-channel reverse link is replaced with a multi-channel reverse link. The multi-channel forward link may include a first forward link channel and a second forward link channel, each with a higher coding gain than that of the single-channel forward link, to provide an aggregate data rate that is substantially the same as that of the single-channel forward link. The multi-channel reverse link may include a first reverse link channel and a second reverse link channel, each with a higher coding gain than that of the single-channel reverse link, to provide an aggregate data rate that is substantially the same as that of the single-channel reverse link.

20 Claims, 4 Drawing Sheets

(56) References Cited

U.S. PATENT DOCUMENTS

| | | | |
|---|---|---|---|
| 2008/0219228 A1* | 9/2008 | Seok et al. | 370/338 |
| 2009/0005049 A1 | 1/2009 | Nishio et al. | |
| 2009/0156227 A1* | 6/2009 | Frerking et al. | 455/455 |
| 2010/0027482 A1* | 2/2010 | Murakami et al. | 370/329 |
| 2010/0113004 A1 | 5/2010 | Cave et al. | |
| 2010/0172279 A1 | 7/2010 | Chen et al. | |
| 2010/0202317 A1* | 8/2010 | Proctor, Jr. | 370/252 |
| 2010/0222059 A1 | 9/2010 | Pani et al. | |
| 2011/0141901 A1* | 6/2011 | Luo et al. | 370/241 |
| 2012/0106490 A1* | 5/2012 | Nakashima et al. | 370/329 |

* cited by examiner

METHOD AND SYSTEM FOR USING MULTI-CHANNEL COMMUNICATION LINKS

BACKGROUND

Cellular wireless communication networks were originally designed to support voice communications. For example, the TIA/EIA-95 family of standards describe a code division multiple access (CDMA) air interface in which different codes define traffic channels that share a 1.25 MHz frequency channel. Each traffic channel can be used to transmit a digitally encoded voice signal, for example, at a data rate of 9600 bits per second (bps).

Cellular wireless communication networks have evolved to support higher data rates for communications over the forward link (from a base station to a mobile station) and the reverse link (from a mobile station to a base station). In the 1xRTT approach of cdma2000, different codes define fundamental channels and supplemental channels that share a 1.25 MHz frequency channel. A forward or reverse fundamental channel may be configured to support a data rate of up to 14.4 kpbs. A supplemental channel, however, may be configured to support a higher data rate. For example, a forward or reverse supplemental channel may be configured to support a data rate of up to 307.2 kpbs.

In order to achieve a particular data rate in a fundamental or supplemental channel, the signal is transmitted in accordance with predefined characteristics, including a particular type of modulation and a particular type of forward error correction (FEC) coding. The predefined characteristics that may be used to achieve different data rates are described in $3^{rd}$ Generation Partnership Project 2, "Physical Layer Standard for cdma2000 Spread Spectrum Systems, Revision E," 3GPP2 C.S0002-E, Version 1.0, September 2009, which is incorporated herein by reference.

OVERVIEW

In a first principal aspect, an exemplary embodiment provides a method for a radio access network (RAN) involved in a call with a mobile station. The RAN receives a single-channel reverse link signal for the call from the mobile station. The single-channel reverse link signal has a first reverse-link coding gain. A determination is made that the single-channel reverse link signal received by the RAN has an inadequate signal quality. In response to the determination, the RAN transmits channel information to the mobile station. After transmitting the channel information, the RAN receives a multi-channel reverse link signal for the call from the mobile station. The multi-channel reverse link signal comprises a first-channel reverse link signal transmitted over a first reverse link channel and a second-channel reverse link signal transmitted over a second reverse link channel. Each of the first-channel and second-channel reverse link signals has a respective coding gain that is higher than the first reverse-link coding gain.

In a second principal aspect, an exemplary embodiment provides a method for a radio access network (RAN) involved in a call with a mobile station. The RAN transmits a single-channel forward link signal for the call to the mobile station. The single-channel forward link signal has a first forward-link coding gain. A determination is made that the single-channel forward link signal received by the mobile station has an inadequate signal quality. In response to the determination, the RAN transmits a multi-channel forward link signal for the call to the mobile station. The multi-channel forward link signal comprises a first-channel forward link signal transmitted over a first forward link channel and a second-channel forward link signal transmitted over a second forward link channel. Each of the first-channel and second-channel forward link signals has a respective coding gain that is higher than the first forward-link coding gain.

In a third principal aspect, an exemplary embodiment provides a method for managing a communication session between a radio access network (RAN) and a mobile station. The RAN uses a single-channel forward link to wirelessly communicate with the mobile station for the communication session. The single-channel forward link has a first forward-link coding gain. The mobile station uses a single-channel reverse link to wirelessly communicate with the RAN for the communication session. The single-channel reverse link has a first reverse-link coding gain. A signal quality degradation in the communication session is detected. In response to the detected signal quality degradation, the RAN converts at least one of the single-channel forward link and single-channel reverse link into at least one multi-channel link. The at least one multi-channel link comprises a plurality of air interface channels. Each of the air interface channels has a respective coding gain that is higher than that of the at least one single-channel forward link and single-channel reverse link. The communication session is continued using the at least one multi-channel link.

In a fourth principal aspect, an exemplary embodiment provides a system comprising a transceiver system and a controller for controlling the transceiver system. The transceiver system is configured to transmit wireless signals to a mobile station over any of a plurality of forward link channels and to receive wireless signals from the mobile station over any of a plurality of reverse link channels. The controller is configured to: (a) detect a signal quality degradation in a communication session between the transceiver system and the mobile station, the communications session using a single-channel forward link and a single-channel reverse link; (b) in response to the detected signal quality degradation, control the transceiver system to convert at least one of the single-channel forward link and single-channel reverse link into at least one multi-channel link, the at least one multi-channel link comprising a plurality of air interface channels, each with a respective coding gain that is higher than that of the at least one single-channel forward link and single-channel reverse link; and (c) instruct the transceiver system to continue the communication session using the at least one multi-channel link.

DETAILED DESCRIPTION OF EXEMPLARY EMBODIMENTS

1. Introduction

Figure 1:
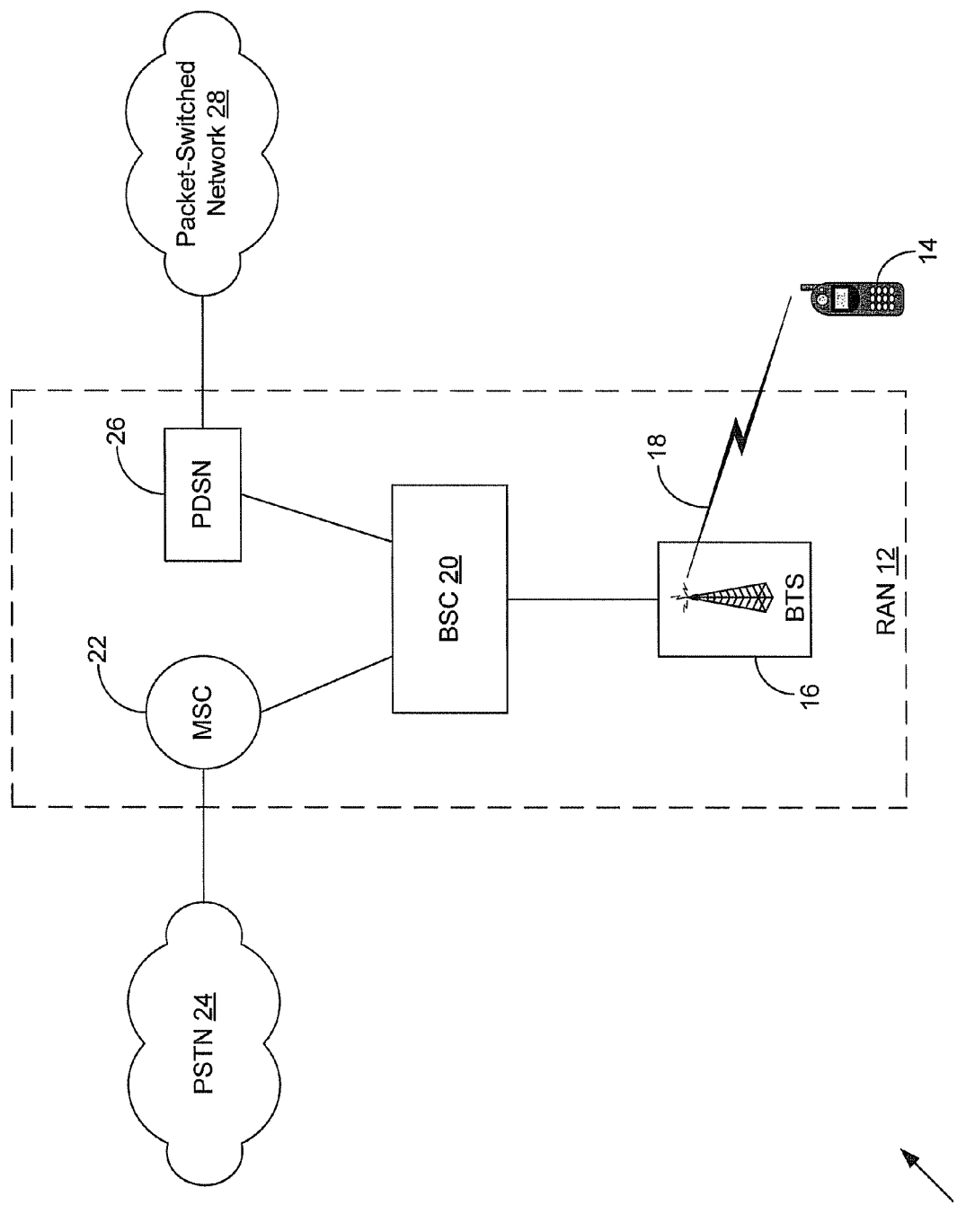
FIG. 1 is a block diagram of a wireless telecommunications network, in accordance with an exemplary embodiment.

The inventors have recognized that many of the approaches used to achieve high data rates for wireless communications can also be used to improve the signal quality of low data rate signals, such as voice signals. For example, the use of error correction coding, symbol repetition, or other techniques may provide a coding gain that enables a signal to be reliably received at a lower signal-to-noise ratio. Thus, when the signal quality of a wireless signal is determined to be inadequate (e.g., the error rate in the received signal becomes too high), it may be beneficial to transmit the signal with a higher coding gain. The higher coding gain may lower the error rate in the received signal.

However, increasing the coding gain may also reduce the data rate. To make up for the reduction in data rate, a signal may be transmitted over multiple channels. For example, a voice signal that is normally transmitted over a single channel at a data rate of 9.6 kbps may instead be transmitted over two channels, each with a data rate of 4.8 kbps. In this approach, the overall data rate stays the same. Beneficially, however, each of the 4.8 kpbs channels may have a higher coding gain than the original 9.6 kbps channel to allow for more reliable reception. In a 1 xRTT system, this can be achieved by using a fundamental channel configured for a data rate of 4.8 kbps in combination with a supplemental channel configured for a data rate of 4.8 kbps. Thus, the original 9.6 kbps voice signal may be split up by transmitting half of the voice frames over the fundamental channel and half of the voice frames over the supplemental channel.

It is to be understood that this approach could also be applied to signals other than voice signals and could be applied to signals with data rates that are either higher or lower than 9.6 kbps. In addition, this approach could be applied to the forward link, the reverse link, or both. Thus, a forward link signal may be transmitted over two or more forward link channels instead of a single forward link channel and/or a reverse link signal may be transmitted over two or more reverse link channels instead of a single reverse link channel.

In an exemplary embodiment, when a mobile station is engaged in a communication session (e.g., a voice call) via a radio access network (RAN), in which signals are transmitted over a single-channel forward link and a single-channel reverse link, the RAN and/or the mobile station may monitor the signal quality of communication session. If a degradation in the signal quality is detected, then the single-channel forward link may be converted to a multi-channel forward link to provide a higher coding gain for the forward link signals and/or the single-channel reverse link may be converted to a multi-channel reverse link to provide a higher coding gain for the reverse link signals. A degradation in signal quality may be detected when an error rate (such as a frame error rate) in the received forward link or reverse link signal exceeds a threshold value. Alternatively, a degradation in signal quality may be detected when a signal-to-noise ratio that is measured for the forward link or reverse link signal (or for an associated pilot signal) falls below a threshold value.

The multi-channel forward link may use two or more forward link channels, such as a forward fundamental channel and a forward supplemental channel. The multi-channel forward link may provide an aggregate data rate that is substantially the same as that of the single-channel forward link, or it may provide an aggregate data rate that is higher. The multi-channel reverse link may use two or more reverse link channels, such as a reverse fundamental channel and a reverse supplemental channel. The multi-channel reverse link may provide an aggregate data rate that is substantially the same as that of the single-channel reverse link, or it may provide an aggregate data rate that is higher. If radio frequency (RF) conditions subsequently improve, the multi-channel forward link could be converted back into a single-channel forward link and/or the multi-channel reverse link could be converted back into a single-channel reverse link.

In this way, a forward link and/or reverse link may be reconfigured in response to changing RF conditions. When RF conditions are good, a forward link or reverse link may be configured to use a single channel to transmit a signal. When RF conditions are bad, the forward link and/or reverse link may be configured to use multiple channels to transmit the signal, in order achieve a higher coding gain and thereby transmit the signal more reliably.

2. Exemplary Wireless Telecommunications Network

FIG. 1 is a block diagram of a wireless telecommunications network 10 in which exemplary embodiments may be employed. Wireless telecommunications network 10 includes a radio access network (RAN) 12 that can wirelessly communicate with mobile stations, such as mobile station 14. Mobile station 14 could be, for example, a wireless telephone, wireless personal digital assistant, wirelessly-equipped computer, or other wireless communication device.

To support wireless communication with mobile stations, such as mobile station 14, RAN 12 may include one or more base transceiver stations (BTSs), exemplified in FIG. 1 by BTS 16. BTS 16 has a wireless coverage area (e.g., a cell or one or more sectors) within which BTS 16 can wirelessly communicate with mobile stations. For example, BTS 16 may communicate with mobile station 14 over an air interface 18, as shown in FIG. 1. The wireless communications between BTS 16 and mobile station 14 over air interface 18 may be in accordance with a protocol such as 1 xRTT CDMA, EVDO, GSM, WiMAX (IEEE 802.16), WiFi (IEEE 802.11), UMTS, LTE, or other wireless communication protocol.

Although FIG. 1 shows RAN 12 with only one BTS, it is to be understood that RAN 12 may include a greater number. RAN 12 may also include one or more controllers, such as a base station controller (BSC) 20, which may control one or more BTSs, such as BTS 16.

RAN 12 may, in turn, be communicatively coupled to one or more other types of networks. For example, RAN 12 may include a mobile switching center (MSC) 22 that is communicatively coupled to a circuit-switched network, such as PSTN 24, and to BSC 20. Alternatively or additionally, RAN 12 may include a packet data serving node (PDSN) 26 that is communicatively coupled to a packet-switched network 28, such as the Internet, and to BSC 20. It is to be understood, however, that the configuration of RAN 12 shown in FIG. 1 is exemplary only, as RAN 12 could be communicatively coupled to other types of networks and/or could be configured in other ways.

With the configuration of RAN 12 shown in FIG. 1, mobile station 14 may be able to engage in a voice call with one or more endpoints via PSTN 24. Such endpoints could be for example, landline stations or other mobile stations. Mobile station 14 may also be able to engage in a data call with one or more endpoints via packet-switched network 28. Such data calls may involve the exchange of voice (e.g., VoIP communications), data, video, and/or other media, with endpoints such as VoIP devices, e-mail servers, Web servers, gaming servers, instant messaging servers, or streaming media servers.

Figure 2:
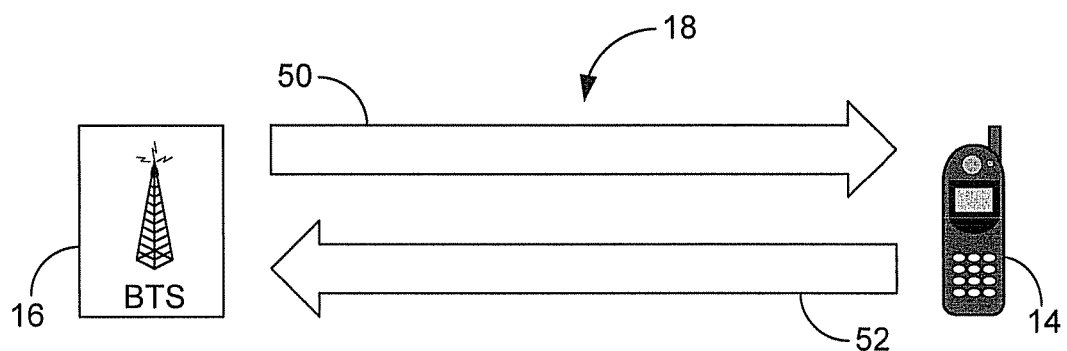
FIG. 2 is a schematic diagram of an air interface configuration that includes a single-channel forward link and a single-channel reverse link, in accordance with an exemplary embodiment.

The communications over air interface 18 may include forward link signals transmitted by BTS 16 over one or more forward link channels. The communications over air interface 18 may also include reverse link signals transmitted over one or more reverse link channels. For example, air interface 18 could be configured for a communication session involving mobile station 14 and BTS 16 as illustrated in FIG. 2. In the example of FIG. 2, BTS 16 transmits a single-channel forward link signal for the communication session over a forward link channel 50, and mobile station 14 transmits a single-channel reverse link signal for the communication session over a reverse link channel 52.

Figure 3:
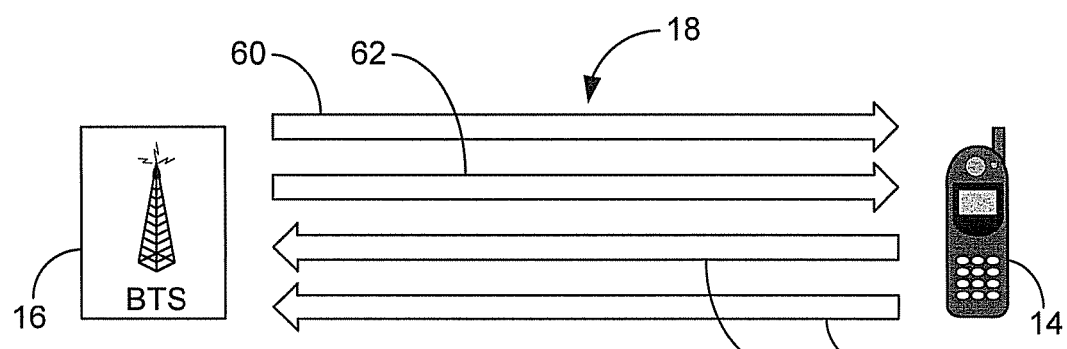
FIG. 3 is a schematic diagram of an air interface configuration that includes a multi-channel forward link and a multi-channel reverse link, in accordance with an exemplary embodiment.

Alternatively, air interface 18 could be configured as illustrated in FIG. 3. In the example of FIG. 3, BTS 16 transmits a multi-channel forward link signal for the communication session over forward link channels 60 and 62, and mobile station 14 transmits a multi-channel reverse link signal for the communication session over reverse link channels 64 and 66. Forward link channels 60 and 62 could be defined by different codes, frequencies, and/or time slots, as could reverse link channels 64 and 66. For example, if BTS 16 and mobile station 14 communicate using 1xRTT CDMA, then channels 60, 62, 64, and 66 could be a forward fundamental channel, a forward supplemental channel, a reverse fundamental channel, and a reverse supplemental channel, respectively. In that case, forward link channels 60 and 62 may share a 1.25 MHz frequency channel, and reverse link channels 64 and 66 may share a different 1.25 MHz frequency channel. As described in more detail below, air interface 18 may change configuration (from the FIG. 2 configuration to the FIG. 3 configuration, or vice versa) based on changing RF conditions.

In addition to the configurations shown in FIGS. 2 and 3, it is to be understood that other configurations of air interface 18 are possible. For example, air interface 18 could be configured to use a single-channel forward link with a multi-channel reverse link or a multi-channel forward link with a single-channel reverse link. Further, while a multi-channel forward or reverse link signal may be transmitted over two air interface channels as shown in FIG. 3, air interface 18 could also be configured so that a multi-channel forward or reverse link signal is transmitted over more than two air interface channels.

3. Exemplary BTS

Figure 4:
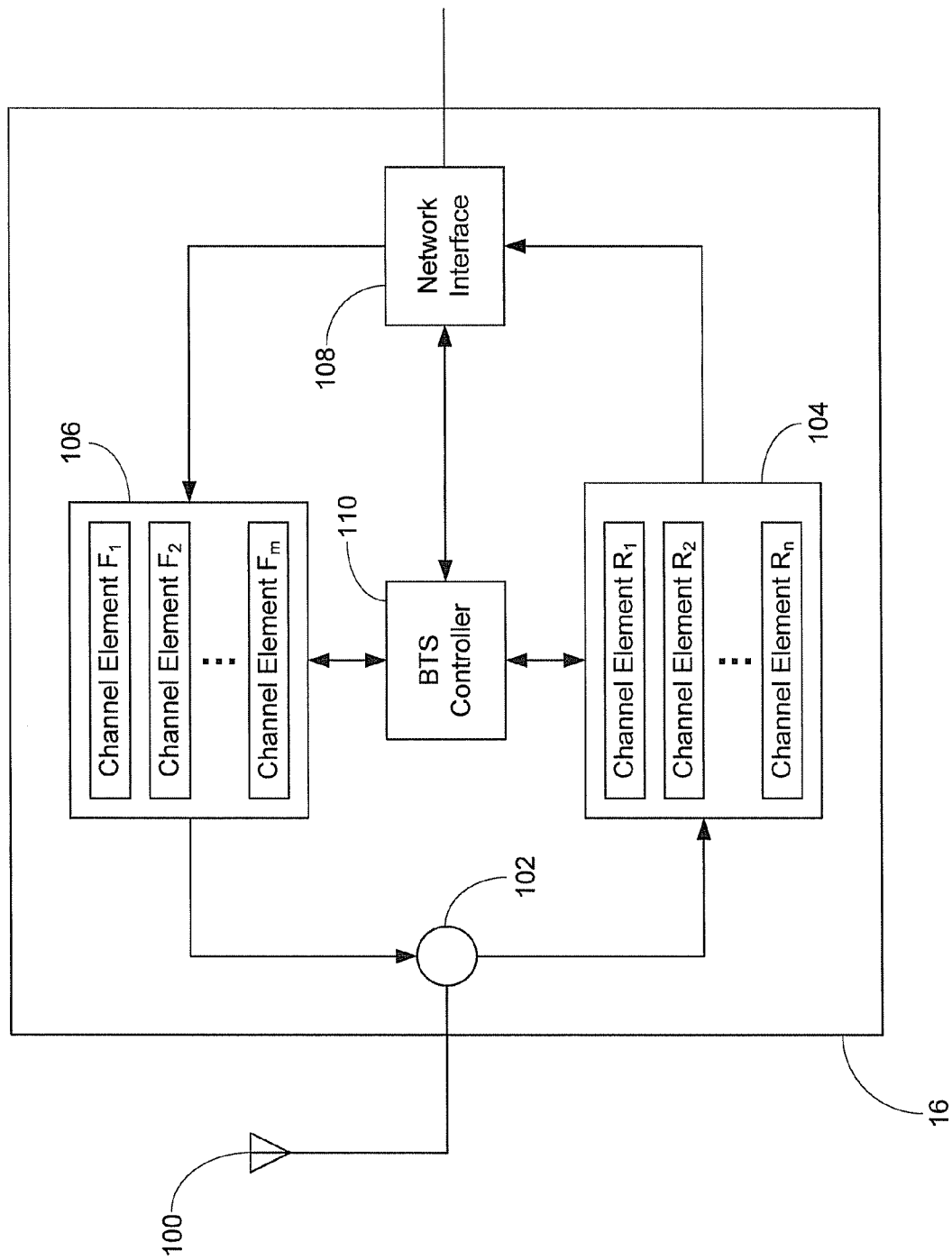
FIG. 4 is a block diagram of a base transceiver station (BTS), in accordance with an exemplary embodiment.

FIG. 4 illustrates an exemplary configuration for BTS 16. BTS 16 includes an antenna system 100 communicatively coupled to an RF distribution system 102. Antenna system 100 may include one or more antennas for wirelessly transmitting RF signals over one or more forward link channels and one or more antennas for wirelessly receiving RF signals over one or more reverse link channels. In an exemplary embodiment, antenna system 100 includes a plurality of directional antennas that define a plurality of sectors. For each sector, antenna system 100 may include, for example, at least one antenna for wirelessly transmitting RF signals and at least one antenna for wirelessly receiving signals.

RF distribution system 102 may distribute RF signals from antenna system 100 to a reverse link block 104 and RF signals from a forward link block 106 to antenna system 100. RF distribution system 102 may include, for example, coaxial cables, optical fibers, splitters, combiners, switches, and/or amplifiers, depending on the location and configuration of BTS 16.

BTS 16 may include a network interface 108 for interfacing BTS 16 with one or more network elements in RAN 12. For example, network interface 108 may interface BTS 16 with BSC 20. Network interface 108 may also be communicatively coupled to forward link block 106 and reverse link block 104. For example, network interface 108 may receive reverse-link signals from reverse link block 104 and transmit them to BSC 20. Further, network interface 108 may receive forward-link signals from BSC 20 and direct them to forward-link block 106 for transmission by antenna system 100.

Forward link block 106 may include a plurality of forward-link channel elements, shown in FIG. 4 as channel elements $F_1$ through $F_m$. Each forward-link channel element may be associated with a particular forward-link channel used by BTS 16. Thus, each of channel elements $F_1$ through $F_m$ may include hardware and/or software components that are configured to receive a network-level signal from network interface 108 and perform encoding, modulation, and/or other operations to convert the network-level signal into an RF signal that BTS 16 can transmit over a particular forward link channel. In the example illustrated in FIG. 4, forward link block 106 includes m forward-link channel elements. These m forward-link channel elements could all be associated with the same sector, or they could be used for multiple sectors. Further, different forward-link channel elements could be associated with different types of forward link channels, such as forward fundamental channels and forward supplemental channels.

Reverse link block 104 may include a plurality of reverse-link channel elements, shown in FIG. 4 as channel elements $R_1$ through $R_n$. Each reverse-link channel element may be associated with a particular reverse-link channel used by BTS 16. Thus, each of channel elements $R_1$ through $R_n$ may include hardware and/or software components that are configured to receive an RF signal corresponding to a particular reverse link channel and perform demodulation, decoding, and/or other operations to convert the RF signal into a network-level signal that network interface can transmit to BSC 20. In the example illustrated in FIG. 4, reverse link block 104 includes n reverse-link channel elements. These n reverse-link channel elements could all be associated with the same sector, or they could be used for multiple sectors. Further, different reverse-link channel elements could be associated with different types of reverse link channels, such as reverse fundamental channels and reverse supplemental channels.

BTS 16 may also include a BTS controller 110 that controls the usage and configuration of forward-link channel elements $F_1$ through $F_m$, in forward link block 106 and reverse-link channel elements $R_1$ through $R_n$ in reverse link block 104. For example, BTS controller 110 may allocate for a given communication session a forward-link channel element in forward link block 106 (e.g., channel element $F_1$) for a forward fundamental channel and a reverse-link channel element in reverse link block 104 (e.g., channel element $R_1$) for a reverse fundamental channel. In response to a degradation in quality of the communication session, BTS controller 110 may allocate one or more additional channel elements for the communication session. For example, BTS controller 110 may allocate an additional forward-link channel element (e.g., channel element $F_2$) for a forward supplemental channel and an additional reverse-link channel element (e.g., channel element $R_2$) for a reverse supplemental channel. In addition, BTS controller 110 may control the configurations of forward-link channel elements $F_1$ and $F_2$ to transmit the forward link signal with a higher coding gain and may control the configurations of reverse-link channel elements $R_1$ and $R_2$ to receive a reverse link signal with a higher coding gain.

BTS controller 110 may control forward link block 106 and/or reverse link block 104 either autonomously or in response to instructions from one or more other network elements, such as from BSC 20. For example, BTS controller 110 may obtain information regarding the quality of network-level signals provided by reverse-link channel elements in reverse link block 104 and/or information regarding signal qualities transmitted by forward-link channel elements in forward link block 106 and received by mobile stations, provide the information to BSC 20 via network interface 108, receive responsive instructions from BSC 20 via network interface 108, and control forward link block 106 and/or reverse link block 104 in accordance with the instructions.

In this way, a controller, such as BSC 20, may detect a signal quality degradation in a communication session involving BTS 16 and mobile station 14 that uses a single-channel forward link and a single-channel reverse link. In response to the detected signal quality degradation, BSC 20 may control BTS 16 to (i) convert at least one of the single-channel forward link and single-channel reverse link into at least one multi-channel channel that uses air interface channels that provide a higher coding gain and, (ii) communicate the new channel information to mobile station 14, and (iii) continue the communication session using the at least one multi-channel link.

4. Exemplary Method

Figure 5:
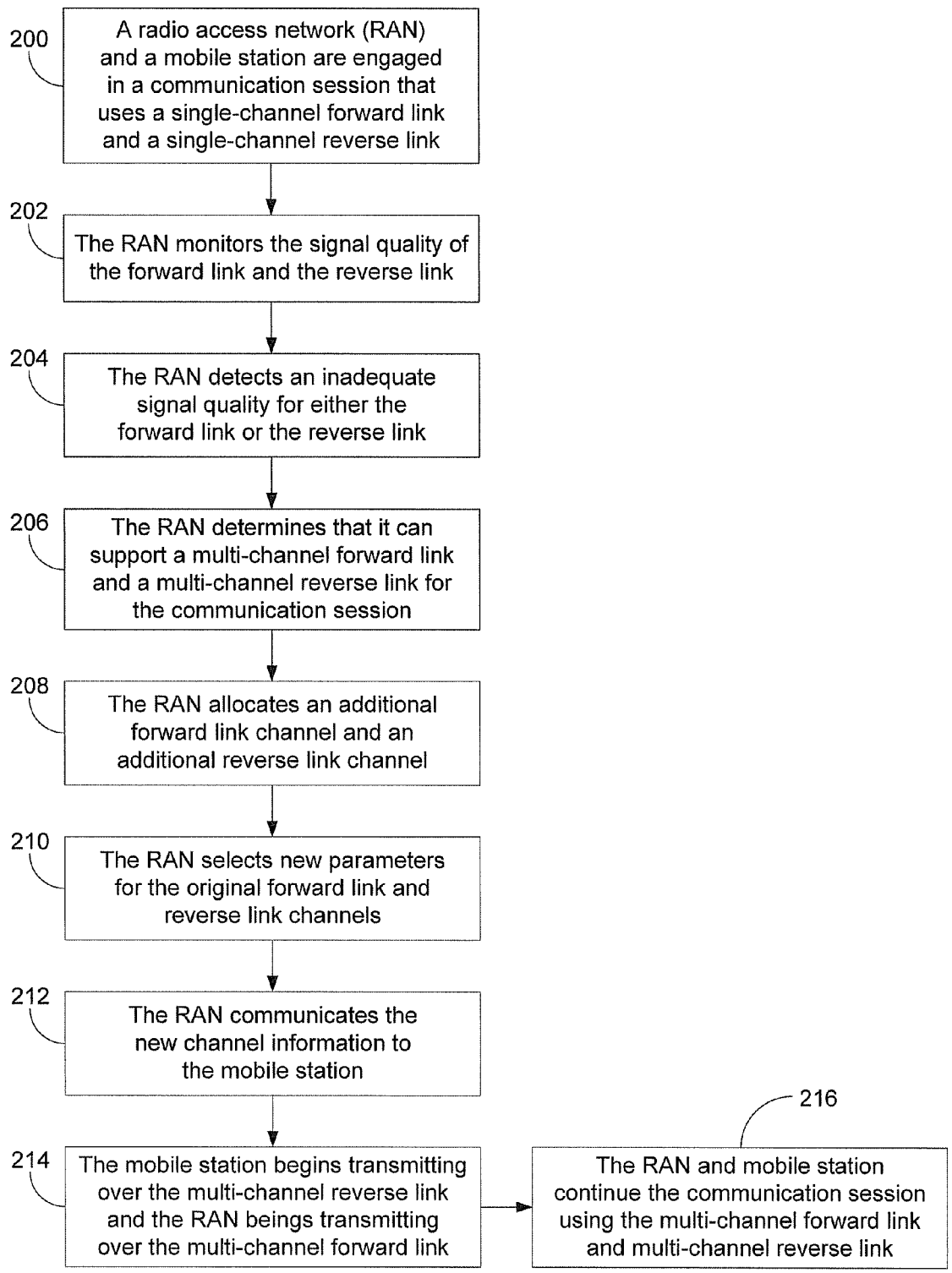
FIG. 5 is a flow chart illustrating a method for converting single-channel communication links into multi-channel communication links, in accordance with an exemplary embodiment.

FIG. 5 is a flow chart illustrating an exemplary method for converting single-channel communication links to multi-channel communication links. For purposes of illustration, FIG. 5 is described with reference to the configurations of wireless telecommunications network 10 shown in FIG. 1, the configurations of air interface 18 shown in FIGS. 2 and 3, and the configuration of BTS 16 shown in FIG. 4. It is to be understood, however, that other configurations could be used.

The method begins when a RAN (e.g., RAN 12) and a mobile station (e.g., mobile station 14) are engaged in a communication session that uses a single-channel forward link and a single-channel reverse link, as indicated by block 200. The communication session may use air interface 18 configured as shown in FIG. 2, with BTS 16 in RAN 12 transmitting a single-channel forward link signal over forward link channel 50 and mobile station 14 transmitting a single-channel reverse link signal over reverse link channel 52. The communication session could be, for example, a voice call or a data call. In the case of a voice call, BTS 16 may transmit voice frames over forward link channel 50 at a data rate of 9600 bps and mobile station 14 may transmit voice frames over reverse link channel 52 at a data rate of 9600 bps. Thus, in a 1xRTT system, forward link channel 50 could be a forward fundamental channel and reverse link channel 52 could be reverse fundamental channel.

During the communication session, the RAN monitors the signal quality of the forward link and the reverse link, as indicated by block 202. The RAN could monitor signal quality by monitoring an error rate, such as a frame error rate or bit error rate, in the received signal. For example, BSC 20 in RAN 12 may monitor the frame error rate of the reverse link signal received by BTS 16, and mobile station 14 may monitor the frame error rate of the forward link signal that it receives and report the frame error rate to RAN 12.

Alternatively or additionally, the RAN could monitor signal quality by monitoring a signal-to-noise ratio of the reverse link signal. As one example, the signal-to-noise ratio could be an $E_b/N_0$ measurement of the reverse link signal after it has been de-spread, where $E_b$ is the bit energy and $N_0$ is the noise. As another example, the signal-to-noise ratio could be an $E_c/I_0$ measurement of the reverse pilot signal transmitted by the mobile station, where $E_c$ is the chip energy and $I_0$ is the total RF energy in the frequency band. The mobile station may make similar measurements of the signal-to-noise ratio of the forward link signal and report the measurements to the RAN. In addition to error rates and signal-to-noise ratios, other quality metrics could also be monitored by the RAN.

At some point, the RAN detects an inadequate signal quality for either the forward link or the reverse link, as indicated by block 204. To determine whether the signal quality of the forward link or the reverse link is inadequate, the RAN may compare a quality metric to one or more threshold values.

In one example, the RAN monitors the frame error rate of the reverse link signal transmitted by the mobile station for the communication session and periodically compares the reverse link frame error rate, $E_R$, to a threshold value, $R_1$. If $E_R$ is greater R/, then the RAN may consider the signal quality of the reverse link signal to be inadequate, and the RAN may attempt to improve the signal quality by converting the single-channel reverse link into a multi-channel reverse link. However, the RAN may also compare $E_R$ to a higher threshold value, $R_2$. If $E_R$ is greater $R_2$, then the RAN may consider the signal quality of the reverse link signal to be so degraded that the RAN will not even attempt a conversion to a multi-channel reverse link. Thus, the RAN may continue with a single-channel reverse link if $E_R<R_1$ and may convert the single-channel reverse link to a multi-channel reverse link if $R_1<E_R<R_2$.

The RAN may use a similar approach for determining whether the signal quality of the forward link is inadequate. Thus, the RAN may receive a forward link error rate, $E_F$, reported by the mobile station and may compare $E_F$ to threshold values $F_1$ and $F_2$. Based on these comparisons, the RAN may determine whether to convert the single-channel forward link to a multi-channel forward link. For example, the RAN may continue with a single-channel forward link if $E_F<F_1$ and may convert the single-channel reverse link to a multi-channel reverse link if $F_1<E_F<F_2$. If $E_F>F_2$ then the RAN may consider the signal quality to be so degraded that a conversion to a multi-channel forward link would not be justified.

The RAN may use other types of thresholds for other types of quality metrics. For example, if the RAN monitors a signal-to-noise ratio, S, for either the forward link or the reverse link, the RAN may compare S to threshold values $T_1$ and $T_2$. If $S>T_1$, the RAN may continue with the single-channel link. If $T_2<S<T_1$, then the RAN may convert the single-channel link to a multi-channel link. If $S<T_2$ then the RAN may consider the signal quality to be so degraded that a conversion to a multi-channel link would not be justified.

It is to be understood that comparing a quality metric to one or more threshold values is only one example of how the RAN may determine whether or not the forward link or reverse link signal quality is adequate. The RAN could use other criteria, which may involve other quality metrics or combinations of quality metrics, to determine whether the signal quality of the communication session has degraded to the point that converting a single-channel link to a multi-channel link is justified.

The RAN may convert a single-channel forward link into a multi-channel forward link while maintaining a single-channel reverse link, if the reverse link signal quality is adequate. Similarly, the RAN may convert a single-channel reverse link into a multi-channel reverse link while maintaining a single-channel forward link, if the forward link signal quality is adequate. Alternatively, the RAN may convert both single-channel links to multi-channels when either the forward link signal quality or the reverse link signal quality is inadequate. For example, if the RAN detects that the reverse link signal quality is inadequate, the RAN may convert both single-channel links into multi-channel links, even though the forward link signal may have an adequate signal quality.

For purposes of illustration, the example of FIG. 5 assumes that the RAN has determined to convert the single-channel links into multi-channel links, based on inadequate signal quality for the forward link and/or reverse link. Before proceeding with the conversion, the RAN may first determine that it can support a multi-channel forward link and a multi-channel reverse link for the communication session, as indicated by block 206. To make this determination, the RAN may determine that forward link channels, reverse link channels, Walsh codes, transmission power, and/or other resources are available for the additional channels. The RAN may also consider the current traffic levels, for example, based on the number of users, the number of communication sessions, the amount of data being buffered, etc. In addition, the RAN may consider the current interference level in the mobile station's sector, for example, based on a reverse noise rise (RNR) level. If the RAN determines, based on these factors or other factors, that it can support multi-channel links, then the RAN may proceed with the conversion. Otherwise, the RAN may continue the communication session with single-channel links.

For purposes of illustration, the example of FIG. 5 assumes that the RAN has determined that it can support a multi-channel forward link and a multi-channel reverse link for the communication session. To proceed with the conversion, the RAN allocates an additional forward link channel and an additional reverse link channel for the communication session, as indicated by block 208. The additional channels could be, for example, supplemental channels.

As part of the process of allocating the additional channels, the RAN may also select one or more parameters that affect the data rate and coding gain of the channels. Such parameters may include, for example, the type of error correction coding that is used, the amount of symbol repetition that is used, the type of modulation, and/or other characteristics. The RAN may select the parameters so that the additional forward link channel has a higher coding gain and lower data rate than that the original forward link channel and the additional reverse link channel has a higher coding gain and lower data rate than the original reverse link channel. The RAN may also select new parameters for the original forward link and reverse link channels, as indicated by block 210. The RAN may select the new parameters for the original channels so as to match the parameters selected for the additional channels.

In this way, each of the forward link channels in the multi-channel forward link may be configured to have a coding gain that is higher than that of the original forward link channel in the single-channel forward link, and each of the reverse link channels may be configured to have a coding gain that is higher than that of the original reverse link channel in the single-channel forward link. The data rate of each channel in the multi-channel forward link and the multi-channel reverse link may be lower than that of the original channel in the corresponding single-channel link. For example, the original forward link channel and reverse link channel may each have had a data rate of 9600 bps. However, after the conversion to multi-channel links, the forward and reverse link channels may each have a data rate of only 4800 bps, due to the higher coding gain. Nonetheless, because multiple channels are used for the forward link and reverse link, the aggregate data rate may remain substantially the same. Thus, the multi-channel forward link may provide an effective data rate that is substantially the same as the original, single-channel forward link, and the multi-channel reverse link may provide an effective data rate that is substantially the same as the original, single-channel reverse link.

The RAN communicates the new channel information to the mobile station, as indicated by block 212. The new channel information may identify the additional forward link channel and the additional reverse link channel, for example, by identifying their corresponding Walsh codes. The new channel information may also specify the new parameters selected for the original forward link and reverse link channels.

The mobile station may then begin transmitting over the multi-channel reverse link and the RAN may begin transmitting over the multi-channel forward link, as indicated by block 214. Thus, at this point, the RAN and mobile station may begin using an air interface that is configured as shown in FIG. 3.

With reference to FIG. 3, the RAN may transmit a subset of the voice or other media generated for the communication session over forward link channel 60 and a subset of the voice or other media over forward link channel 62. For example, in the case of a voice call, the RAN may transmit successive voice frames in alternate channels. In this way, during the time it took the RAN to transmit two successive voice frames over the single-channel forward link, the RAN may be able to transmit two successive voice frames over the multi-channel forward link, i.e., transmitting one voice frame over channel 60 and transmitting the other voice frame over channel 62. Similarly, the mobile station may transmit a subset of the voice or other media generated for the communication session over reverse link channel 64 and a subset of the voice or other media over reverse link channel 66.

The RAN and mobile station may continue the communication session using the multi-channel forward link and multi-channel reverse link, as indicated by block 216. It is to be understood that the RAN may also continue monitoring the signal quality of the forward link and reverse link signals. At some point, the RAN may determine that RF conditions have improved sufficiently that the RAN may convert the multi-channel links back into single-channel links. In this way, the RAN may adjust the air interface used for a communication session involving the RAN and a mobile station to adapt to changing RF conditions.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a radio access network (RAN) involved in a call with a mobile station, said method comprising:

said RAN receiving a single-channel reverse link signal for said call from said mobile station, said single-channel reverse link signal having a first reverse-link coding gain and a first reverse-link data rate;

making a determination that said single-channel reverse link signal received by said RAN has an inadequate signal quality;

in response to said determination, said RAN transmitting channel information to said mobile station; and after making said determination and transmitting said channel information, said RAN receiving a multi-channel reverse link signal for said call from said mobile station, said multi-channel reverse link signal comprising a first-channel reverse link signal transmitted over a first reverse link channel and a second-channel reverse link signal transmitted over a second reverse link channel, wherein each of said first-channel and second-channel reverse link signals has a respective coding gain that is higher than said first reverse-link coding gain, and wherein said multi-channel reverse link signal has an aggregate data rate that is substantially equal to said first reverse-link data rate.

2. The method of claim 1, wherein said first-channel reverse link signal and said second-channel reverse link signal both have a second reverse-link coding gain, said second reverse-link coding gain being higher than said first reverse-link coding gain.

3. The method of claim 2, wherein said channel information indicates said second reverse-link coding gain.

4. The method of claim 1, wherein each of said first-channel and second-channel reverse link signals has a second reverse-link data rate, said second reverse-link data rate being lower than said first reverse-link data rate.

5. The method of claim 1, wherein said first reverse link channel is a fundamental channel and said second reverse link channel is a supplemental channel.

6. The method of claim 1, wherein said channel information identifies said second reverse link channel.

7. The method of claim 1, wherein said channel information identifies a new configuration for said first reverse link channel.

8. The method of claim 1, wherein making a determination that said single-channel reverse link signal received by said RAN has an inadequate signal quality comprises:
determining that said RAN is receiving said single-channel reverse link signal with an error rate that is higher than a threshold error rate.

9. The method of claim 1, wherein said call is a voice call.

10. The method of claim 9, further comprising:
said mobile station generating for said call a plurality of voice frames for transmission to said RAN;
said mobile station transmitting a first subset of said voice frames over said first reverse link channel; and
said mobile station transmitting a second subset of said voice frames over said second reverse link channel.

11. The method of claim 1, further comprising:
said RAN transmitting a single-channel forward link signal for said call to said mobile station, said single-channel forward link signal having a first forward-link coding gain;
in response to said determination, said RAN transmitting a multi-channel forward link signal for said call to said mobile station, said multi-channel forward link signal comprising a first-channel forward link signal transmitted over a first forward link channel and a second-channel forward link signal transmitted over a second forward link channel, wherein each of said first-channel and second-channel forward link signals has a respective coding gain that is higher than said first forward-link coding gain.

12. The method of claim 11, wherein said call is a voice call, further comprising:
said RAN generating for said call a plurality of voice frames for transmission to said mobile station;
said RAN transmitting a first subset of said voice frames over said first forward link channel; and
said RAN transmitting a second subset of said voice frames in said second forward link channel.

13. A method for a radio access network (RAN) involved in a call with a mobile station, said method comprising:
said RAN transmitting a single-channel forward link signal for said call to said mobile station, said single-channel forward link signal having a first forward-link coding gain and a first forward-link data rate;
making a determination that said single-channel forward link signal received by said mobile station has an inadequate signal quality; and
in response to said determination, said RAN transmitting a multi-channel forward link signal for said call to said mobile station, said multi-channel forward link signal comprising a first-channel forward link signal transmitted over a first forward link channel and a second-channel forward link signal transmitted over a second forward link channel, wherein each of said first-channel and second-channel forward link signals has a respective coding gain that is higher than said first forward-link coding gain, and wherein said multi-channel forward link signal has an aggregate data rate that is substantially equal to said first forward-link data rate.

14. The method of claim 13, wherein making a determination that said single-channel forward link signal received by said mobile station has an inadequate signal quality comprises:
said mobile station detecting an error rate in said single-channel forward link signal received by said mobile station;
said mobile station reporting said error rate to said RAN; and
said RAN determining that said error rate is higher than a threshold error rate.

15. The method of claim 13, further comprising:
said RAN receiving a single-channel reverse link signal for said call from said mobile station, said single-channel reverse link signal having a first reverse-link coding gain;
in response to said determination, said RAN transmitting channel information to said mobile station; and
after transmitting said channel information, said RAN receiving a multi-channel reverse link signal for said call from said mobile station, said multi-channel reverse link signal comprising a first-channel reverse link signal transmitted over a first reverse link channel and a second-channel reverse link signal transmitted over a second reverse link channel, wherein each of said first-channel and second-channel reverse link signals has a respective coding gain that is higher than said first reverse-link coding gain.

16. A method for managing a communication session between a radio access network (RAN) and a mobile station, said method comprising:
said RAN wirelessly communicating with said mobile station for said communication session, via a single-channel forward link and a single-channel reverse link;
detecting a signal quality degradation in said communication session;
in response to said detected signal quality degradation, said RAN wirelessly communicating with said mobile station via a multi-channel link in place of a corresponding single-channel link, wherein said corresponding single-channel link is one of said single-channel forward link and single-channel reverse link, said multi-channel link comprising a plurality of air interface channels, wherein each air interface channel has a respective coding gain that is higher than a coding gain of said corresponding single-channel link, and wherein said multi-channel link has an aggregate data rate that is substantially equal to a data rate of said corresponding single-channel link; and continuing said communication session using said multi-channel link.

17. The method of claim 16, wherein said corresponding single-channel link is said single-channel forward link, and wherein said air interface channels in said multi-channel link are forward-link channels.

18. The method of claim 16, wherein said corresponding single-channel link is said single-channel reverse link, and wherein said air interface channels in said multi-channel link are reverse-link channels.

19. A system comprising:
- a transceiver system, wherein said transceiver system is configured to transmit wireless signals to a mobile station over any of a plurality of forward link channels and to receive wireless signals from said mobile station over any of a plurality of reverse link channels;
- a controller for controlling said transceiver system, wherein said controller is configured to: (a) detect a signal quality degradation in a communication session between said transceiver system and said mobile station, said communication session using a single-channel forward link and a single-channel reverse link; (b) in response to said detected signal quality degradation, control said transceiver system to use a multi-channel link in place of a corresponding single-channel link, wherein said corresponding single-channel is one of said single-channel forward link and single-channel reverse link, said at least one multi-channel link comprising a plurality of air interface channels, wherein each air interface channel has a respective coding gain that is higher than a coding gain of said corresponding single-channel link, and wherein said multi-channel link has an aggregate data rate that is substantially equal to a data rate of said corresponding single-channel link; and (c) instruct said transceiver system to continue said communication session using said multi-channel link.

20. The system of claim 19, wherein said transceiver system is in a base transceiver station (BTS) and said controller is in a base station controller (BSC).

* * * * *